United States Patent [19]

Neddenriep et al.

[11] Patent Number: 5,593,522
[45] Date of Patent: Jan. 14, 1997

[54] PNEUMATIC VEHICLE TIRE WITH OPTIMIZED RECYCLABILITY

[75] Inventors: Thomas Neddenriep, Schwarmstedt; Theodor Frucht, Hanover, both of Germany

[73] Assignee: Continental Aktiengesellschaft, Hanover, Germany

[21] Appl. No.: 519,363

[22] Filed: Aug. 25, 1995

Related U.S. Application Data

[62] Division of Ser. No. 255,642, Jun. 7, 1994, Pat. No. 5,467,807.

[30] Foreign Application Priority Data

Jun. 7, 1993 [DE] Germany .................. 43 18 825.7

[51] Int. Cl.⁶ .................. B60C 9/00; B60C 9/20; B60C 9/22; B60C 15/04
[52] U.S. Cl. .................. 152/458; 152/527; 152/531; 152/533; 152/540; 152/541; 152/543; 152/547; 152/548; 156/95
[58] Field of Search .................. 152/458, 527, 152/531, 533, 540, 541, 543, 547, 548; 156/95; 245/1.5

[56] References Cited

U.S. PATENT DOCUMENTS

| | | | |
|---|---|---|---|
| 3,085,616 | 4/1963 | Smith et al. | 152/537 X |
| 3,945,420 | 3/1976 | Görter et al. | 152/458 X |
| 4,320,791 | 3/1982 | Fujii et al. | 152/540 |
| 4,856,573 | 8/1989 | Morikawa et al. | 152/556 |
| 4,871,004 | 10/1989 | Brown et al. | 152/527 X |
| 5,335,707 | 8/1994 | Sano et al. | 152/556 X |

OTHER PUBLICATIONS

Patent Abstracts of Japan, vol. 11, No. 333 (M-637), Oct. 30, 1987 & JP-A-62 116302 (Bridgestone Corp.), May 27, 1987.

*Primary Examiner*—Adrienne C. Johnstone
*Attorney, Agent, or Firm*—Robert W. Becker & Associates

[57] ABSTRACT

A pneumatic vehicle tire has two beads each having a bead core and a carcass of at least one layer anchored at the bead cores within the beads. The beads further have bead profiling members. A reinforcement structure is located radially outwardly of the carcass, and a tread is positioned radially outwardly of the reinforcement structure. The carcass is made of aramid cord fabric and the bead cores are made of aramid cords. The reinforcement structure is made of synthetic fiber-reinforced rubber or of aramid cords. The bead profiling members are made of rubber reinforced with synthetic fibers.

10 Claims, 1 Drawing Sheet

PNEUMATIC VEHICLE TIRE WITH OPTIMIZED RECYCLABILITY

This application is a division, of application Ser. No. 08,255,642 filed Jun. 7, 1994 now U.S. Pat. No. 5,967,807.

BACKGROUND OF THE INVENTION

The present invention relates to a built or assembled pneumatic vehicle tire, especially tires for trucks and heavy equipment, with a single- or multi-layer reinforcement carcass which is anchored in the beads by winding about the bead cores, with bead profiling members in the beads, and with a tire tread as well as a reinforcement structure positioned between the carcass and the tire tread. Conventional pneumatic vehicle tires for commercial vehicles (trucks and heavy equipment) are provided with a carcass made of steel cord whereby also a multi-layer belt is provided that is also comprised of steel cord. Furthermore, the bead cores are also made of steel wires. When bead reinforcement members are provided, they, in general, are also made of steel cord strips. Thus, steel as a tire building material considerably contributes to the total weight of the tire.

Recently, recyclability of used tires has become more and more important. In this context, shredding of the tires with high steel cord contents presents a considerable problem. Furthermore, it is very difficult to remove the rubber adhering to the steel cord from the steel cords.

It is therefore an object of the present invention to provide a pneumatic vehicle tire of the aforementioned kind which allows for an optimized recyclability.

SUMMARY OF THE INVENTION

The pneumatic vehicle tire according to the present invention is primarily characterized by:

Two beads each having a bead core;

A carcass of at least one layer anchored at the bead cores within the beads;

The beads further comprising bead profiling members;

A reinforcement structure located radially outwardly of the carcass;

A tread positioned radially outwardly of the reinforcement structure;

The carcass essentially consisting of aramid cord fabric;

The bead cores essentially consisting of aramid cords;

The reinforcement structure essentially consisting of rubber reinforced with synthetic fibers; and The bead profiling members essentially consisting of rubber reinforced with synthetic fibers.

Advantageously, each one of the beads includes a bead reinforcement element essentially consisting of rubber reinforced with synthetic fibers. Preferably, the rubber reinforced with synthetic fibers of the bead reinforcement elements is identical to the rubber reinforced with synthetic fibers of the reinforcement structure and the bead profiling members.

Expediently, the rubber reinforced with synthetic fibers contains 10% to 50% by weight synthetic fibers. Preferably, the synthetic fibers consist of aramid. Advantageously, the synthetic fibers have a length of 0.01 mm to 6 mm and have a diameter of 5 μm to 100 μm.

In another embodiment of the present invention, the pneumatic vehicle tire is primarily characterized by:

Two beads each having a bead core;

A carcass of at least one layer anchored at the bead cores within the beads;

The beads further comprising bead profiling members;

A reinforcement structure located radially outwardly of the carcass;

A tread positioned radially outwardly of the reinforcement structure;

The carcass essentially consisting of aramid cord fabric;

The bead cores essentially consisting of aramid cords;

The reinforcement structure essentially consisting of aramid cords; and

The profiling bead members essentially consisting of rubber reinforced with synthetic fibers.

Advantageously, each of the beads includes a bead reinforcement element made of rubber reinforced with synthetic fibers.

Preferably, the rubber reinforced with synthetic fibers of the bead reinforcement elements is identical to the rubber reinforced with synthetic fibers of the bead profiling members.

Preferably, the rubber reinforced with synthetic fibers contains 10% to 50% by weight synthetic fibers. Preferably, the synthetic fibers are aramid. Expediently, the synthetic fibers have a length of 0.01 mm to 6 mm and have a diameter of 5 μm to 100 μm.

In another embodiment of the present invention, the reinforcement structure is comprised of a plurality of reinforcement layers with neighboring ones of the reinforcement layers positioned in a crossed reinforcement arrangement.

Preferably, the reinforcement structure is comprised of continuous windings of aramid cords. Alternatively, the reinforcement structure is comprised of continuous windings of material strips comprised of a plurality of aramid cords.

According to the present invention, the carcass is comprised of a fabric made of aramid cords, the bead cores are made of aramid fibers and the reinforcement structure as well as the bead profiling members are made of rubber reinforced with synthetic fibers. According to another solution the reinforcement structure is comprised of a plurality of layers of aramid cords instead of the rubber reinforced with synthetic fibers.

By suggesting a pneumatic vehicle tire that is free of steel, the separation of rubber and steel cord during the recycling process of the used vehicle tire is obsolete. Also, the known problems encountered when shredding the tire no longer exist. It is thus possible to perform a pyrolytic or hydrolytic decomposition of the entire tire material.

A further technical advantage of the present invention is that the weight of a truck tire is reduced by approximately 25% resulting in a reduced rolling resistance. Due to the considerable reduction of the tire weight, it is thus possible to allow for a greater pay load. The reduced rolling resistance also results in fuel savings. Furthermore, it is advantageous that by using rubber reinforced with synthetic fibers at the different locations within the tire, especially within the reinforcement structure, a stiffness discontinuity or a stiffness leap between these parts and the neighboring rubber is reduced so that the rubber components in the named areas are subjected to a considerably reduced load.

The invention with all its advantages is especially useful for pneumatic vehicle tires for trucks (commercial vehicles), however, in general, the tire of the present invention is also suitable for automobiles.

According to a further embodiment of the invention the bead reinforcement elements of the tire are also made of rubber reinforced with synthetic fibers. Within the different tire components the rubber reinforced with synthetic fibers may have a synthetic fiber content of 10% to 50% by weight, preferably of approximately 25% by weight.

The plastic material to be used for the synthetic fibers is preferably aramid; however, if desired, it is, of course, also possible to use other plastic materials to produce synthetic fibers. The use of aramid is advantageous because the entire pneumatic vehicle tire is then comprised of only one single plastic material which during recycling results in considerable simplifications of the process.

The synthetic fibers to be employed may have a length of 0.01 to 6 mm, whereby preferably fibers of 0.1 to 2 mm in length are used. The fibers may be present in different lengths of the suggested range, but may also be provided with a certain constant length. The synthetic (plastic) fibers may have a diameter of 5 to 100 μm. Especially for the rubber to be used as the reinforcement structure, it may be advantageous that the synthetic fibers are introduced into the rubber plate for building the tire in a certain orientation.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 and 2.

Figure 1:
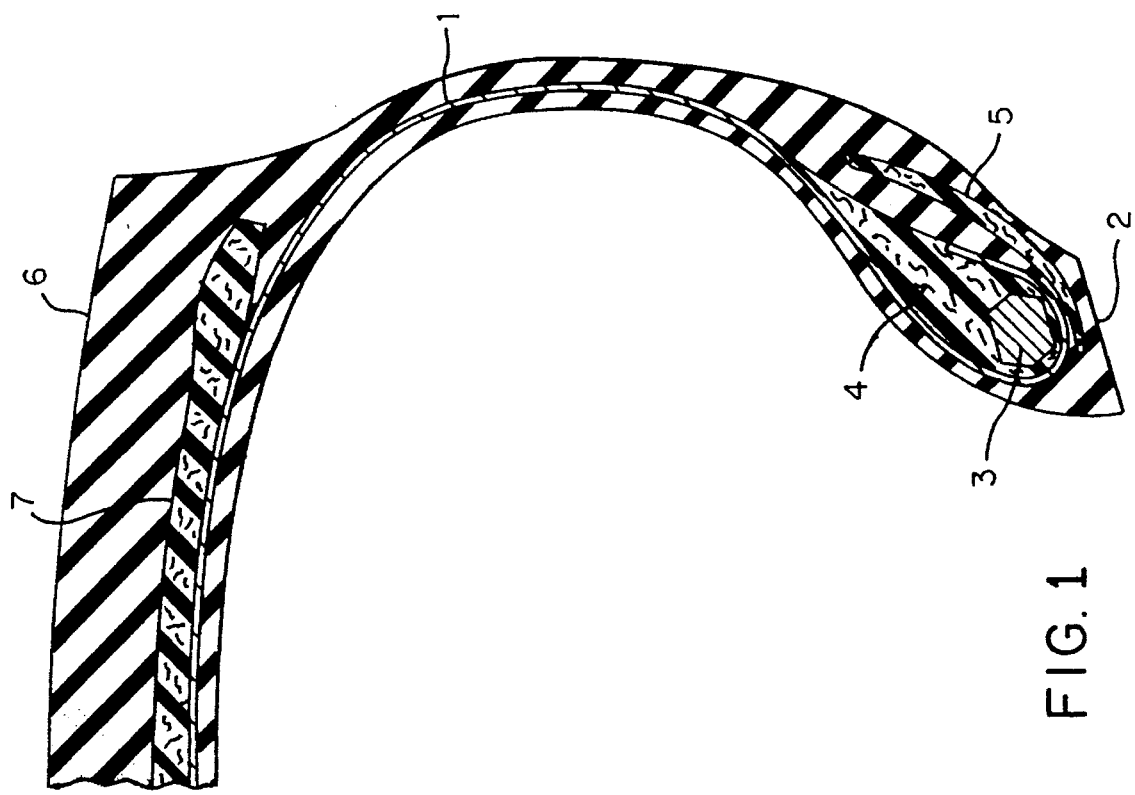
FIG. 1 shows a pneumatic vehicle tire for commercial vehicles in a radial cross-section.

The pneumatic vehicle tire of FIG. 1 has a carcass 1 which, for example, can be a radial carcass and may be comprised of aramid cord fabric. The carcass 1 is anchored in the area of the beads 2 by winding about the pull-resistant bead cores 3. Radially outwardly of the bead cores 3 on each side of the tire a bead profiling member 4 is provided. Axially outwardly of the bead core 3 and the bead profiling member 4 a bead reinforcement element 5 is arranged.

Between the carcass 1 and the tire tread 6 a reinforcement structure 7 is arranged. The reinforcement structure 7 is comprised of rubber reinforced with synthetic fibers in which, for example, aramid is used as the synthetic fiber. During building of the tire the reinforcement structure 7 may be assembled by placing one or a plurality of rubber plates made of rubber reinforced with synthetic fibers onto the carcass. It is possible to use as many as five rubber plates. The synthetic fibers within the individual rubber plates may be arranged in certain orientations.

The bead profiling member 4 is comprised of rubber reinforced with synthetic fibers whereby the plastic material for the synthetic fibers is again aramid. The bead reinforcement elements 5 may be comprised of the same material. By using synthetic fibers within the bead reinforcement elements 5 chafing and friction within the area of the rim flanges are reduced or prevented. The bead cores 3 which may be of a hexagonal or round or square cross-section may also be comprised of aramid cords as the carcass 1. The aramid cords are wound in the circumferential direction to form a core package.

In the case of tires for automobiles it is possible to build a tire without the bead reinforcement elements 5 and to design the bead cores 3 of a smaller size, for example, with a round cross-section. Furthermore, it is sufficient for automobile tires to provide a reduced number of carcass layers as well as a reinforcement structure 7 that is thinner.

Figure 2:
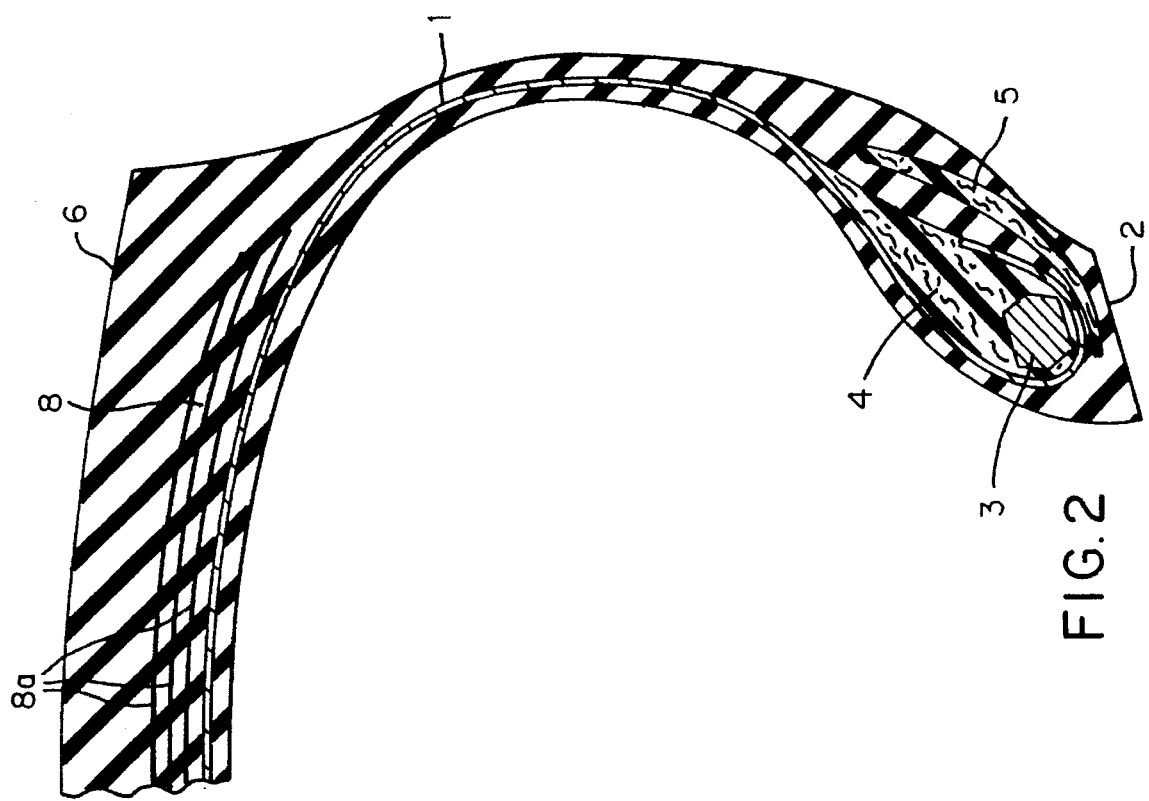
FIG. 2 shows the pneumatic vehicle tire of FIG. 1 with a belt made of aramid cord fabric.

The tire of FIG. 2 is essentially identical to the tire of FIG. 1 with the exception of the reinforcement structure 7. Instead of the reinforcement structure 7 made of rubber reinforced with synthetic fibers, the tire according to FIG. 2 is provided with a three-layer belt 8 whereby each layer has reinforcements in the form of aramid fibers or aramid cords. Preferably, the aramid cords extend within one layer parallel to one another, but at a slant to the circumferential direction of the tire whereby they may have an angle of 15° to 70° to the circumferential tire direction. The cord fabric of neighboring layers is arranged in a crossed reinforcement arrangement as is conventional. For an improved adhesion of the aramid cord or aramid fibers within the tire they are embedded in a rubber coating. The aramid fibers or aramid cords have a diameter of 0.7 to 2 mm and have a fiber density of 40 to 80 fibers per 10 cm.

If so desired, the belt 8, of course, may be comprised of only two layers or may have four or five layers. It should be noted that the belt 8 may also be produced by winding aramid cord or preferably a material strip essentially consisting of a plurality of aramid cords onto the carcass. The material strips are then wound in a plurality of windings that are placed directly adjacent to one another or in an overlapping arrangement.

The present invention is, of course, in no way restricted to the specific disclosure of the specification and drawings, but also encompasses any modifications within the scope of the appended claims.

What we claim is:

1. A pneumatic vehicle tire comprising:

two beads each having a bead core;

a carcass of at least one layer anchored at said bead cores within said beads;

said beads further comprising bead profiling members;

a reinforcement structure located radially outwardly of said carcass;

a tread positioned radially outwardly of said reinforcement structure;

said carcass consisting essentially of aramid cord fabric;

said bead cores consisting essentially of aramid cords;

said reinforcement structure consisting essentially of aramid cords; and said bead profiling members consisting essentially of rubber reinforced with synthetic fibers.

2. A tire according to claim 1, wherein each one of said beads includes a bead reinforcement element consisting essentially of rubber reinforced with synthetic fibers.

3. A tire according to claim 2, wherein said rubber reinforced with synthetic fibers of said bead reinforcement elements is identical to said rubber reinforced with synthetic fibers of said bead profiling members.

4. A tire according to claim 1, wherein said rubber reinforced with synthetic fibers contains 10% to 50% by weight synthetic fibers.

5. A tire according to claim 4, wherein said synthetic fibers are aramid.

6. A tire according to claim 4, wherein said synthetic fibers have a length of 0.01 mm to 6 mm.

7. A tire according to claim 4, wherein said synthetic fibers have a diameter of 5 μm to 100 μm.

8. A tire according to claim 1, wherein said reinforcement structure is comprised of a plurality of reinforcement layers, with the aramid cords of neighboring ones of said reinforcement layers positioned in a crossed arrangement.

9. A tire according to claim 1, wherein said reinforcement structure is produced by continuous windings of said aramid cords.

10. A tire according to claim 1, wherein said reinforcement structure is produced by continuous windings of material strips consisting essentially of a plurality of said aramid cords.

* * * * *